United States Patent
Bhandari et al.

(10) Patent No.: US 9,417,343 B1
(45) Date of Patent: Aug. 16, 2016

(54) NEUTRON DETECTOR AND FABRICATION METHOD THEREOF

(71) Applicants: Harish B. Bhandari, Brookline, MA (US); Vivek V. Nagarkar, Weston, MA (US); Olena E. Ovechkina, Alston, MA (US)

(72) Inventors: Harish B. Bhandari, Brookline, MA (US); Vivek V. Nagarkar, Weston, MA (US); Olena E. Ovechkina, Alston, MA (US)

(73) Assignee: Radiation Monitoring Devices, Inc., Watertown, MA (US)

( * ) Notice: Subject to any disclaimer, the term of this patent is extended or adjusted under 35 U.S.C. 154(b) by 0 days.

(21) Appl. No.: 14/729,287

(22) Filed: Jun. 3, 2015

Related U.S. Application Data

(60) Provisional application No. 62/007,178, filed on Jun. 3, 2014.

(51) Int. Cl.
*G01T 1/20* (2006.01)
*G01T 3/06* (2006.01)
*C09K 11/77* (2006.01)

(52) U.S. Cl.
CPC ............... *G01T 3/06* (2013.01); *C09K 11/7733* (2013.01)

(58) Field of Classification Search
CPC ......... G01T 1/20; G01T 1/202; G01T 1/2023; G01T 1/2002; G21K 4/00
See application file for complete search history.

(56) References Cited

PUBLICATIONS

Nagarkar et al. "Lithium Alkali Halides—New Thermal Neutron Detectors with n-γ Discrimination, Nov. 2013, IEEE".*
Stick search report.*

* cited by examiner

*Primary Examiner* — David Porta
*Assistant Examiner* — Mamadou Faye
(74) *Attorney, Agent, or Firm* — Burns & Levinson LLP; Orlando Lopez

(57) ABSTRACT

A neutron detector and a method for fabricating a neutron detector. The neutron detector includes a photodetector, and a solid-state scintillator operatively coupled to the photodetector. In one aspect, the method for fabricating a neutron detector includes providing a photodetector, and depositing a solid-state scintillator on the photodetector to form a detector structure.

20 Claims, 8 Drawing Sheets

NEUTRON DETECTOR AND FABRICATION METHOD THEREOF

CROSS REFERENCE TO RELATED APPLICATIONS

This application claims priority to and benefit of U.S. Provisional Application Ser. No. 62/007,178, entitled NEUTRON DETECTOR AND FABRICATION METHOD THEREOF, filed on Jun. 3, 2014, which is incorporated by reference herein is entirety and for all purposes.

STATEMENT REGARDING GOVERNMENT SPONSORED RESEARCH OR DEVELOPMENT

This invention was made with government support under Grant No. DE-SC0008291, awarded by the Department of Energy. The federal government may have certain rights in the invention.

BACKGROUND

The present teachings relate to a neutron detector and a fabrication method thereof. More particularly, the present teachings relate to a neutron detector comprising a solid state sensing material and a fabrication method thereof.

Various characteristics of nuclear materials need to be tested and studied before use. Such nuclear materials include an accountable nuclear material, which is a collective term that encompasses all materials designated in quantities that require special control. Examples of these materials include plutonium, enriched uranium, americium, and depleted uranium. Effective capabilities to detect, deter, and assist in the prevention of theft or diversions of accountable nuclear materials are, therefore, critical. As such, control of and accountability for these materials are provided through, for example, the Material Control and Accountability (MC&A) program of the Department of Energy (DOE).

Implementation of nuclear Material Control and Accountability MC&A programs requires techniques and equipment that maximize material loss detection sensitivity, increase the accuracy of accountability measurements, minimize material supply disruptions, and reduce the magnitude of inventory differences and associated control limits, consistent with the consequences of the loss, misplacement or inadequate tracking of material. Similarly, new methods and technologies are needed to address key issues affecting future deployments of nuclear-based energy production and of other nuclear materials while reducing the risks already stated. Currently, these tasks often depend upon neutron counters, which typically use moderated thermal neutron detectors. In order to achieve high detection efficiency, thermal neutron detectors filled with $^3$He gas are commonly used. However, due to the acute ongoing worldwide shortage of $^3$He, these detectors have become prohibitively expensive. Thus, successfully undertaking of MC&A requires new detectors that effectively eliminate the need for $^3$He.

Accordingly, there is a need to develop a new detector capable of meeting present and future challenges of low-cost, high neutron detection efficiency, solid-state, and mass-production. Such devices should allow for compact detection system configurations, such as position-sensitive arrays embedded in a moderator, which is not feasible with the larger, $^3$He gas-filled detectors. Further, such a new device should use materials that are easy to produce, economical, and be able to maintain high thermal neutron detection efficiency and gamma rejection close to the $^3$He standards.

SUMMARY

In view of the above, the present teachings provide a scintillator-based high efficiency neutron detector that can effectively operate in a harsh gamma background of accountability measurement environments, particularly in spent reactor fuel storage facilities that are of immediate concern to the DOE.

In one aspect, the present teachings provide a solid-state scintillator having a bi-alkali iodide material, the bi-alkali iodide material being doped with one or more dopant elements. In one aspect, the bi-alkali iodide material includes one of LCI ($Li_3Cs_2I_5$) and LNI ($LiNaI_2$). In one embodiment, the one or more dopant elements include one or more of a periodic table group 13 element and lanthanide element. In another embodiment, the dopant element includes one or more of thallium and europium. In one aspect, a concentration of the dopant element is between about 0.4% and 0.8% ("%" as used herein, refers to mole %).

In another aspect, the present teachings provide a neutron detector, comprising a photodetector, and a solid-state scintillator operatively coupled to the photodetector. In one embodiment, the solid-state scintillator comprises a plurality of microcolumns. In one embodiment, the solid-state scintillator comprises a bi-alkali iodide material having a monoclinic crystal structure. The solid-state scintillator may comprise one of LCI (Li3Cs2I5), LNI (LiNaI2), and CLYC (Cs2LiYCl6). In one embodiment, the bi-alkali iodide material comprises one or more of thallium iodide and europium iodide that results in dopants. In another embodiment, the bi-alkali iodide material comprises CeCl3 that results in dopant.

In another aspect, the present teachings provide a method for fabricating a neutron detector, comprising operatively coupling a solid-state scintillator to a photodetector to form a detector. Prior to disposing the solid-state scintillator, the method further comprises synthesizing a scintillator material to be disposed on the photodetector. In one embodiment, synthesizing the scintillator material comprises mixing a first alkali iodide material and a second alkali iodide material to form a bi-alkali iodide material, and doping the bi-alkali iodide material with one or more metallic iodide materials to form the scintillator material. In one embodiment, disposing the solid-state scintillator comprises evaporating a scintillator material using a hot wall evaporation apparatus. The method further comprises hermetically sealing the detector structure. In one embodiment, hermetically sealing comprises applying a reflective coating to the detector structure.

BRIEF DESCRIPTION OF THE DRAWINGS

For a better understanding of the present teachings, reference is made to the accompanying drawings and detailed description and its scope will be pointed out in the appended claims.

DETAILED DESCRIPTION

Figure 1:
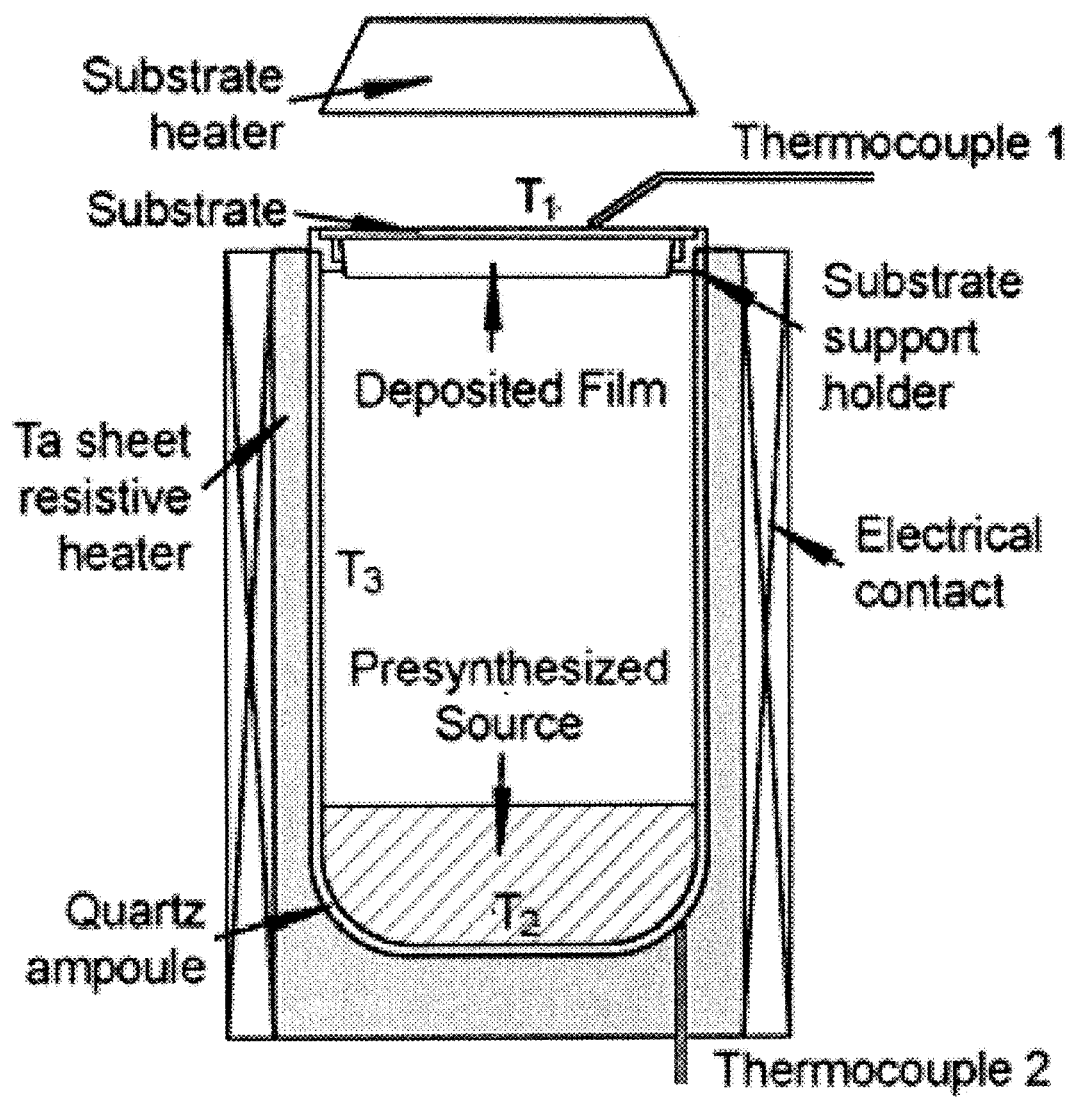
FIG. 1 illustrates a hot wall evaporation scheme implemented inside a vacuum chamber in accordance with one embodiment of the present teachings.

The following detailed description is of the best currently contemplated modes of carrying out these teachings. The description is not to be taken in a limiting sense, but is made merely for the purpose of illustrating the general principles of these teachings, since the scope of these teachings is best defined by the appended claims. Although the teachings have been described with respect to various embodiments, it should be realized these teachings are also capable of a wide variety of further and other embodiments within the spirit and scope of the appended claims.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about."

For the purposes of describing and defining the present teachings, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

A "bi-alkali iodide," as used herein, is a material represented by the chemical formula

where $M^1$, $M^2$ are different alkali metal elements from Group 1 in the periodic table and I is iodine.

In one aspect, the present teachings provide a solid-state scintillator having a bi-alkali iodide material, the bi-alkali iodide material being doped with one or more dopant elements. In one aspect, the bi-alkali iodide material includes one of LCI ($Li_3Cs_2I_5$) and LNI ($LiNaI_2$). In one embodiment, the one or more dopant elements include one or more of a periodic table group 13 element and lanthanide element. In another embodiment, the dopant element includes one or more of thallium and europium. In one aspect, a concentration of the dopant element is between about 0.4% and 0.8% ("%" as used herein, refers to mole %).

In another aspect, the present teachings provide a neutron detector, comprising a photodetector, and a solid-state scintillator operatively coupled to the photodetector. In one embodiment, the solid-state scintillator comprises a plurality of microcolumns. In one embodiment, the solid-state scintillator comprises a bi-alkali iodide material having a monoclinic crystal structure. The solid-state scintillator may comprise one of LCI (Li3Cs2I5) and LNI (LiNaI2). In one embodiment, the bi-alkali iodide material comprises one or more dopants, where the one or more dopants include one or more of a periodic table group 13 element and lanthanide element. In one instance, the one or more dopants include one or more of thallium, a group 13 element, and europium, a lanthanide element.

Figure 8:
FIG. 8 is a block diagram representation of one embodiment of the system of these teachings.

FIG. 8 is a block diagram representation of one embodiment of the neutron detector of these teachings. Referring to FIG. 8, in the embodiment shown therein, a scintillator 115, having a bi-alkali iodide material, is disposed on a photodetector 125.

The present teachings provide a neutron detector comprising scintillators synthesized in, for example, a microcolumnar form using vapor growth techniques or in crystalline form using melt growth. The scintillator materials may be derived from low-cost, well-understood, versatile scintillator hosts CsI and NaI, modified by incorporating Li ions in optimal concentrations to achieve the desired spectroscopic-quality, combined n/γ sensors. In addition to their high light emissions, and ability to effectively discriminate between neutron and gamma interactions based on PSD and PHD, the use of widely available, proven host materials, and a unique vapor deposition method for their synthesis, are exemplary features of the present teachings. This combination allows mass production of large-area, high-performance neutron scintillators in a uniquely time efficient manner.

The scintillator of a neutron detector of the present teachings provide higher thermal neutron detection efficiency than the gold standard $^3$He-filled detector, and at the same time effectively discriminates gamma background through intrinsic pulse shape discrimination (PSD), pulse height discrimination (PHD), and inherently lower gamma sensitivity due to small sensor sizes. The neutron detector of the present teachings, formed by integrating a scintillator into a photodetector, is configured as a handheld instrument capable of counting and spectroscopy, or assembled in very large area formats suitable for imaging. The modular and compact detectors thus formed provide flexibility in configuration and scalability to cover small (1 cm$^2$ or smaller) to large (1 m$^2$ square or larger) sizes, depending on application needs.

A number of exemplary embodiments are presented herein below. It should be noted that the present teachings are not limited only to the exemplary embodiments.

Three materials, LCI ($Li_3Cs_2I_5$:Tl,Eu), LNI ($LiNaI_2$:Tl, Eu), and CLYC ($Cs_2LiYCl_6$), may be used via vapor growth methods. Of these, LCI demonstrates excellent neutron-gamma discrimination using PSD and PHD, and LNI showed exceptionally high PHD. See Table 1 below. Both LCI and LNI materials are easy to fabricate as compared to CLYC using vapor growth and demonstrate unique ability to synthesize in small as well as large area formats. These materials may be fabricated in various shapes, including curved surfaces.

TABLE 1

Properties of neutron synthesized scintillators.

| Property | | CYC | LCI:Eu | LNI:Tl |
|---|---|---|---|---|
| $\lambda_{em}$, nm | | 373 | 450 | 420 |
| Light yield, # photons per | 1 Neutron | 73,000 | 39,980-55,400 | 102,400 |
| | 1 MeV γ | 22,000 | 19,800 | 22,800 |
| e$^-$ Equivalent Energy (MeV) | | 3.32 | 2.1-2.8 | 4.49 |
| Decay time (ns) | | $I_\gamma$ = 1, 50, 1000 | $I_\gamma$ = 509, 926, 1144 | $I_\gamma$ = 181, 295, 1530 |
| | | $I_n$ = 1000 | $I_n$ = 254, 856, 995 | $I_n$ = 207, 486, 1900 |

TABLE 1-continued

Properties of neutron synthesized scintillators.

| Property | CYC | LCI:Eu | LNI:Tl |
|---|---|---|---|
| Density $\rho$, g/cm$^3$ | 3.31 | 4.51 | 3.67 |
| n-$\gamma$ PSD and PHD | Yes | Yes | Yes |

The resulting scintillators are optically bonded or directly deposited onto photosensors, such as SiPMs, APDs, PMTs, and MAPMTs, or large area imaging sensors, such as a-Si:H flat panels. The synthesis method may be used for large-scale production, and offers an added advantage of growth in segmented crystalline form over arbitrarily large areas, which is ideal for effective light collection in spectroscopy and high resolution in imaging scenarios.

Fabrication Techniques and Benefits of Resulting Morphologies

LCI, for example, is a relatively low-density material and melts at ~217° C. As a result, it can be grown using vapor deposition techniques, such as thermal evaporation (TE) and hot wall evaporation (HWE). Because LCI material may be synthesized using iodides of Cs and Li, it is possible to fabricate LCI in single crystal form using Bridgman growth. Thus, depending on the desired format, the material may be grown using the appropriate technique.

LCI with a bi-alkali iodide composition of $Li_3Cs_2I_5$ belongs to the monoclinic crystal system. Vapor deposition of microcolumnar morphology is highly favored in a cubic system, such as CsI. However, the monoclinic lattice has also shown to evolve into similar morphologies. It is relatively easy to grow in a microcolumnar form using a vapor deposition technique. A columnar form favors both high-resolution imaging and spectroscopy due to its inherently localized and highly effective light collection. The microcolumnar nature of the resulting scintillator conserves and promotes channeling of the scintillation light by means of total internal reflection, thereby suppressing lateral light spread within the deposited films. In turn, this results in high spatial resolution, even when the grown structures are thick (e.g., 4 mm) in order to enhance the total absorption of the incident neutron flux. Enhanced light collection in the detector arising from light channeling within microcolumns also helps to achieve high energy resolution, as recently demonstrated through HWE growth of lanthanide halide scintillators. Light collection efficiency can be further enhanced through deposition of these materials directly onto solid-state sensors, an approach that has proven highly effective and desirable.

The Bridgman growth of the material produces single crystals, albeit of smaller volumes than films. However, for handheld instruments and other compact devices and arrays, this form factor is more appropriate. Thus, the material in both large area film and crystal format can be produced.

The choice of LCI as the scintillator material has the following advantages. First, the difference in the scintillation pulse shape for neutrons and $\gamma$-rays in LCI is substantial and leads to excellent PSD as measured. The material shows light emission of ~20,000 photons/MeV ($\gamma$) which is equivalent to the performance of the current state-of-the-art CLYC scintillator. In addition, its electron equivalent energy (EEE) for thermal neutron detection is high, measuring ~2.1 MeV. Depending on variations in synthesis protocol and small deviations in composition, some of the LCI specimens have demonstrated EEE as high as 2.8 MeV. Thus, the EEE may be extended further through systematic variations in material composition.

Second, the phase diagram of $Li_3Cs_2I_5$ is well suited for HWE growth as well as for single crystal fabrication using Bridgman method. This material can be synthesized from iodides of Cs and Li (CsI and LiI) as opposed to synthesizing from the mixture of Cs, I, and Li metals. Synthesis of the material from its metallic constituents has been proven dangerous due to the high vapor pressures created during processing. Based on the phase diagram for CsI-LiI binary systems (shown in FIG. 5), it is apparent that the eutectic composition melts (with no solid phases) at temperature as low as ~217° C. This is an important parameter for our growth process because it enables the liquid-melt-phase reaction of CsI-LiI mixture at temperature low enough to avoid any vapor-phase loss of material that may alter the eutectic composition. Once the material is melted to a single-phase, increasing its temperature results in increased rate of evaporation, thus providing an excellent control over growth rate of films. With this approach, fabrication of thick films up to 4 mm is feasible. These properties greatly enhance the ability to manufacture large area films for commercialization of this technology.

Figure 6:
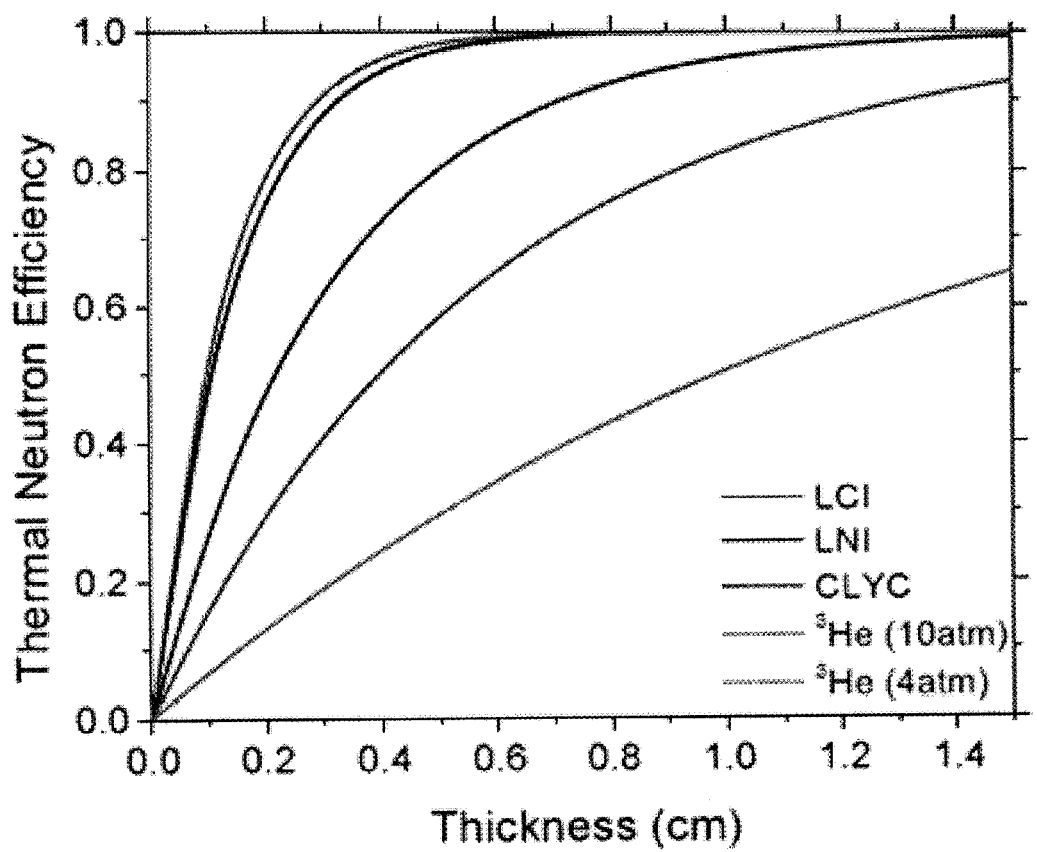
FIG. 6 illustrates a diagram of thermal neutron efficiencies of LCI, LNI, CLYC and 3He.

Third, LCI ($Li_3Cs_2I_5$) has 3 Li atoms per 10 atoms of molecule compared to LNI ($LiNaI_2$) and CLYC ($Cs_2LiYCl_6$:Ce). Therefore, it follows that LCI has higher thermal neutron detection efficiency than the other two. FIG. 6 illustrates a diagram of thermal neutron efficiencies of LCI, LNI, CLYC and $^3$He.

Figure 7:
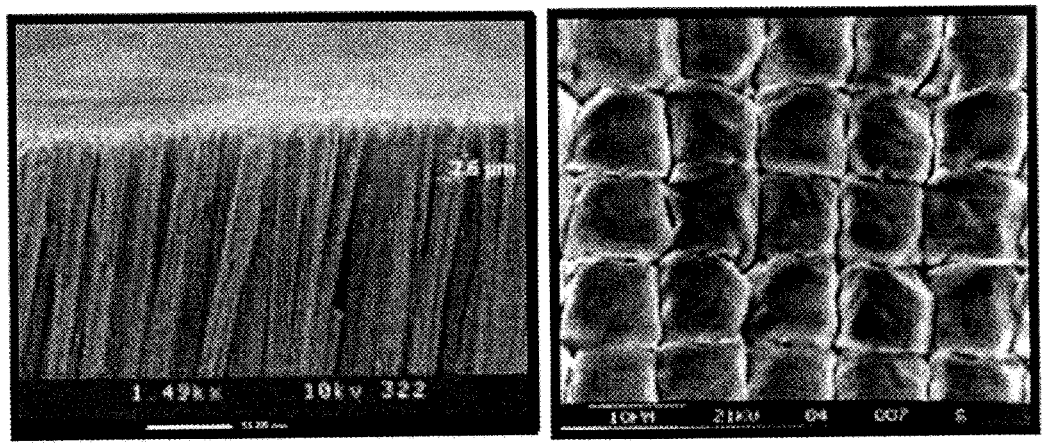
FIG. 7 illustrates a side view and a top view of a microcolumnar scintillator fabricated on a patterned substrate.

Finally, CsI host is inexpensive, widely available, and extensive experience has accrued in creating microcolumnar and crystalline columnar structures using this cubic material. LiI is also cubic, and its addition to the CsI host results in a monoclinic structure, rendering it well suited for columnar growth. FIG. 7 illustrates a side view and a top view of a needle-shaped microcolumnar scintillator fabricated on a patterned substrate. The columnar-shaped scintillator thus grown results in a very high spatial resolution. Note that columns are crystalline and transparent and allow efficient light channeling, yielding significantly improved light collection efficiency.

Although LCI has been described, performance demonstrated by LNI is also quite impressive. Specifically, the LNI material has demonstrated very high EEE of 4.5 MeV, a value approaching the Q value of 4.7 MeV for Li(n,$\alpha$) reaction. As shown in computer simulations, measurement of spent nuclear fuel predominantly emits high flux of low energy gamma rays, which can be effectively discriminated against using exceptionally high PHD offered by LNI. It is observed that the degree to which PSD can be achieved by LNI depends on the composition of LNI ($Li_xNa_{1-x}I_2$, where X can be varied), and consequently optimization of this material is valuable. As such, in certain embodiments, LNI material/synthesis may be used instead of LCI.

Material Pre-Synthesis

For LCI and LNI, pre-synthesis includes creating an admixture of CsI and LiI, or NaI and LiI (with or without enriched Li). The TlI (thallium iodide) and EuI (europium iodide) that result in the dopants are added to the mixture in desired proportions. In one instance, the resulting dopant concentration for Thallium or Europium ranges from 0.4% to 0.8%. High purity (99.99%) anhydrous powders of various compounds are used for this purpose. Since all of these materials are hygroscopic to varying degrees, the weighing and mixing of powders are performed in an ultra-low-humidity dry box. The mixtures thus produced are dry-packaged for transport to the deposition apparatus. The dry-packaged materials may be released in a crucible after the vacuum chamber is pumped down to below $10^{-6}$ Torr. Initially, the admixtures are loaded into quartz ampoules. The evacuated, sealed quartz ampoules are placed inside the furnace for melting the mixture, followed by rapid quenching. The quenched charge is transported to the HWE chamber in much the same way as described above.

Pre-synthesis of CLYC comprises mixing CsCl, LiCl, YCl$_3$, and dopant CeCl$_3$ in appropriate proportions inside the dry box and following the rapid quenching as described above. The quenched charge is transported to the HWE chamber in preparation for film deposition.

During the course of presynthesis, it is discovered that precursors can be effectively created by mixing predetermined quantities of raw CsI and LiI, and introducing them into the HWE chamber, and achieving congruent melting to produce Li$_3$Cs$_2$I$_5$. While the individual melting points of the various constituent materials are well above 450° C., the admixture followed the theoretical phase diagram and demonstrated congruent melting at ~240° C., very close to the 217° C., eutectic point of LCI as determined by thermodynamic calculations. In case of LNI, solid solutions of Li$_x$Na$_{1-x}$I are formed by varying amounts of LiI and NaI in the admixture prior to pre-melting. While samples with up to 50% Li are created towards the end of the process, specimen containing 5% Li synthesized earlier are evaluated.

In some embodiments, LCI and LNI may have a polycrystal structure or a single crystal structure. For example, 1" ∅ crystals can be grown using vertical Bridgman method, using iodides of Li and Na or Cs instead of elementary components to overcome the concerns of excessive pressure during crystal growth. Since the supplied enriched LiI is not very pure (99.9%), the zone purification methods are used to improve the purity to 99.999%. During the crystal growth, graphitized (carbon-coated) ampoules is used to prevent undesired reaction with LCI and LNI compositions. The compositions are held at desired temperatures for 2-3 days before cooling the ampoules. In order to promote long range of lattice order, an approach of slow cooling (~12° C./hr) is adopted. This is in contrast with quenching processes. With these measures in place, one can manufacture large crystals up to 1" by 1" cylinders, which demonstrate high resolution, high light and high sensitivity to neutrons. In certain embodiments, single crystals may be used to produce handheld instruments, while polycrystals may serve as a starting material for vapor growth.

Hot Wall Evaporation System and Film Deposition

FIG. 1 illustrates a hot wall evaporation scheme implemented inside a vacuum chamber in accordance with one embodiment of the present teachings. The walls of the column are heated using a conformal resistive heater. This setup is designed to fabricate 5 cm diameter films as a demonstration of large area synthesis. The use of pre-synthesized compositions substantially simplified the deposition process. However, the vapor pressure of LCI is found to be significantly less than that of CsI. This does not pose any significant issues in growing thick films, because the source temperatures can be raised to increase growth rates, once the single phase of Li$_3$Cs$_2$I$_5$ is formed at eutectic temperature.

The observed lower vapor pressures of LCI makes it necessary to modify the deposition parameters and substrate holder hardware. The most significant changes are to increase the source temperature to maintain the desired growth rate and the installation of a radiant heating capability of the substrate to 250+° C. (see FIG. 1). This is necessary to crystallinity in deposited material to substantially improve film transparency.

The rate of deposition and stoichiometry of the film are substantially influenced by the relative substrate, wall, and source temperatures. Optimization of this balance is therefore essential. In order to produce high quality films, the following relationship is required:

$$T_{Wall} > T_{Source} > T_{Substrate}$$

In case of LCI, stoichiometrically balanced Li$_3$Cs$_2$I$_5$:Tl (LCI:Tl) and Li$_3$Cs$_2$I$_5$:Eu (LCI:Eu) compositions are obtained using both enriched and un-enriched Li. To achieve over 50% absorption for thermal neutrons, the structures on the order of 2 mm thick or so are created. In certain embodiments, up to 5 mm thick structures may be synthesized.

Figure 2A:
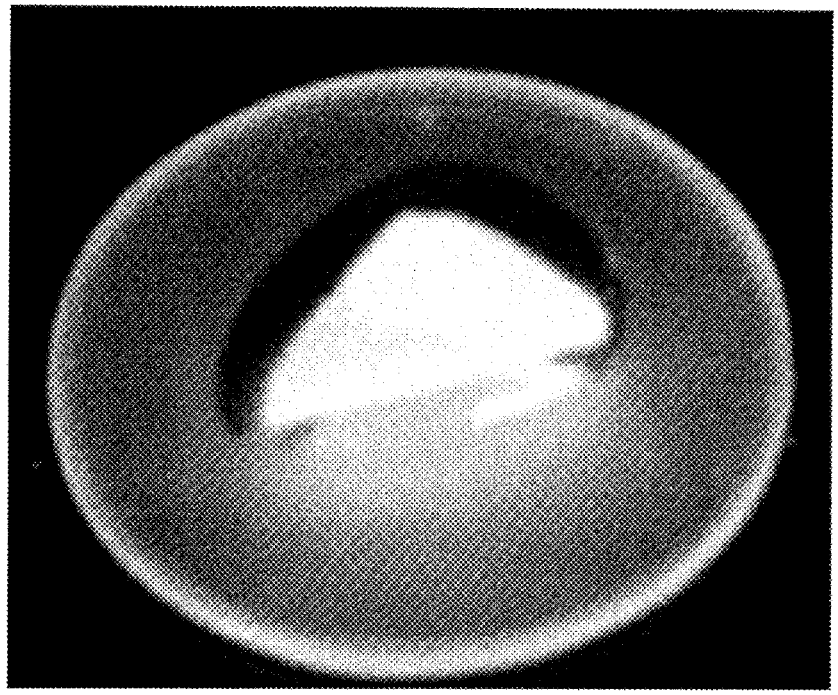
FIGS. 2A and 2B respectfully illustrate a photograph of a 4 mm thick LCI:Eu under UV excitation and a photograph of a hermetically sealed 5 cm diameter LCI:Eu films.
Figure 2B:
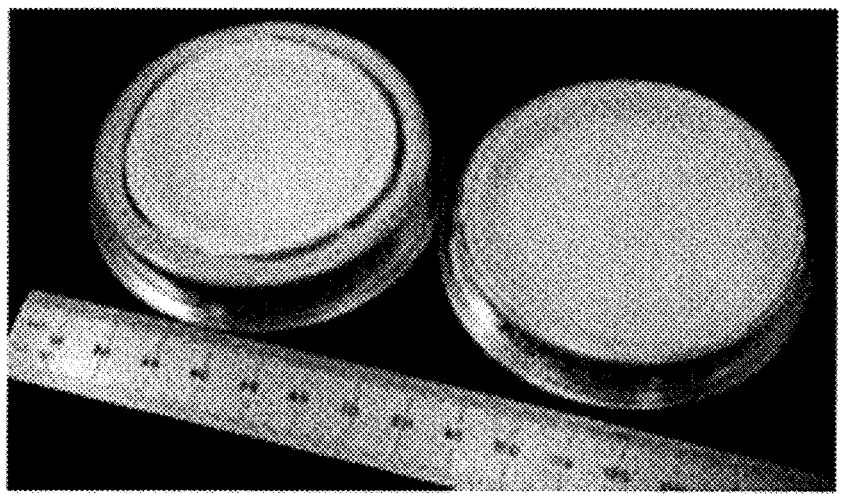
Figure 3A:
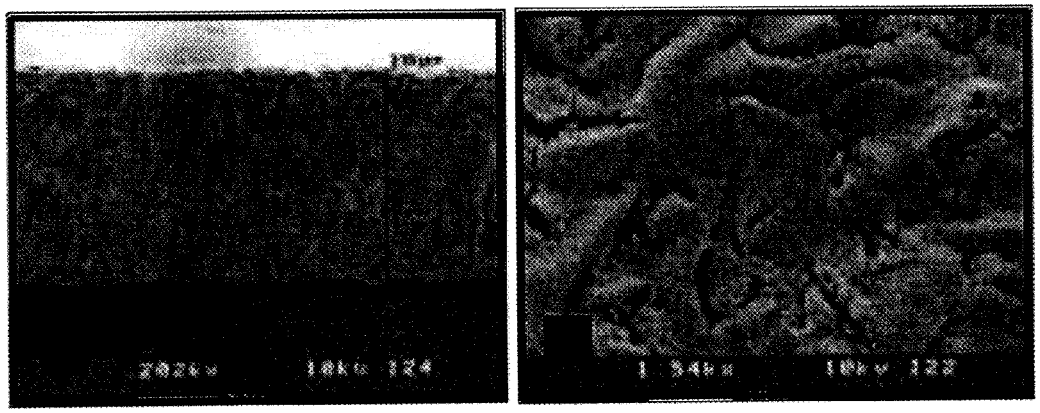
FIG. 3A shows SEM images of an LCI:Eu film.
Figure 3B:
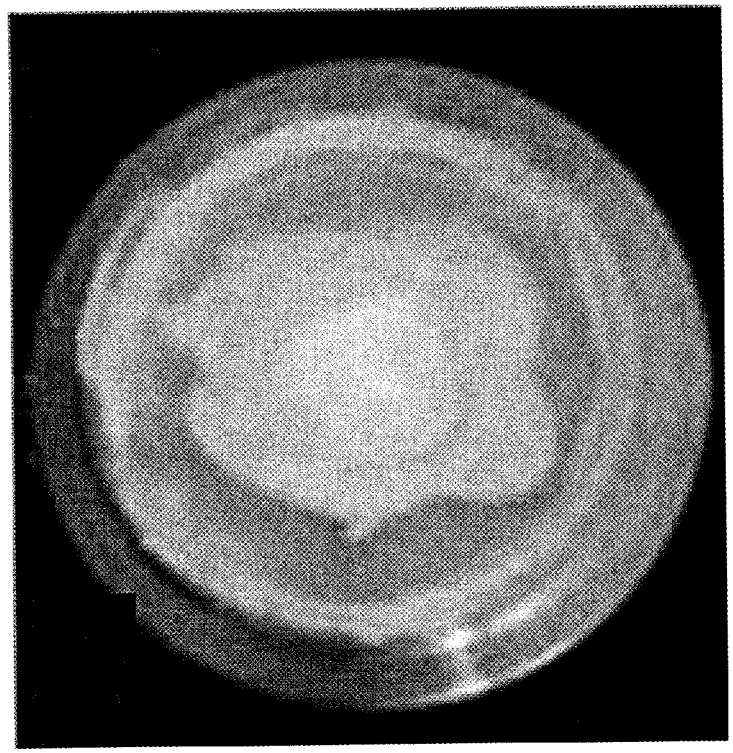
FIG. 3B shows a photograph of hermetically sealed 5 mm thick LNI:Eu specimen.

FIGS. 2A and 2B respectfully illustrate a photograph of a 4 mm thick LCI:Eu under UV excitation and a photograph of a hermetically sealed 5 cm diameter LCI:Eu films. FIG. 3A shows SEM images of an LCI:Eu film. FIG. 3B shows a photograph of hermitically sealed 5 mm thick LNI:Eu specimen. For LNI (Li$_x$Na$_{1-x}$I), Li content may be varied from 0 to 100% to form the solid solution of NaI and LiI. Consequently, various quantities of enriched LiI ranging from 5% to 50% are loaded into NaI. Both LNI:Eu and LNI:Tl compositions are created, all of which demonstrates excellent scintillation.

Figure 4:
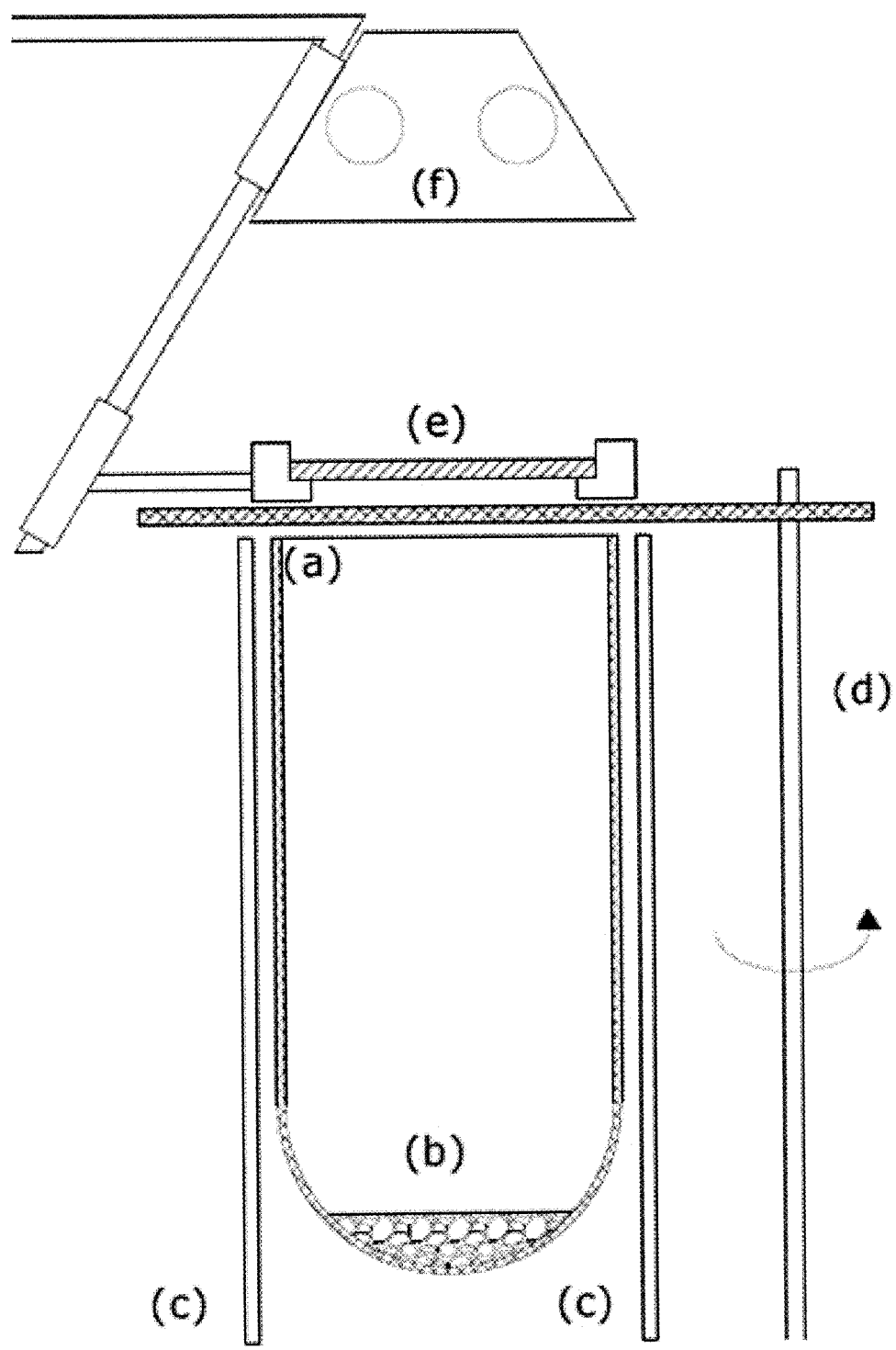
FIG. 4 schematically illustrates a modified HWE apparatus in accordance to an embodiment of the present teachings.

In certain embodiments, LCI and LNI large-area films can be fabricated up to 3 mm thick measuring up to 10 cm ∅ on substrates that are suitable for high-sensitivity neutron detection. To accomplish this, a modified HWE apparatus is used. FIG. 4 schematically illustrates a modified HWE apparatus in accordance with an embodiment of the present teachings. In FIG. 4, (a) denotes quartz crucible, (b) denotes LiI+CsI+EuI2, (c) denotes tantalum heater, (d) denotes shutter, (e) denotes substrate with its holder, and (f) denotes halogen lamp heater. The modified HWE apparatus facilitates the single-phase formation for the ternary compound (LCI or LNI) which is a precursor for vapor-transported deposition process, thereby bypassing the crystal growth step. This approach substantially minimizes the fabrication cost. For instance, the raw materials loaded in the HWE follows the following reaction pathway to form a single phase in the HWE crucible:

2CsI+3LiI+xEuI2→[Li$_3$Cs$_2$I$_5$: x mol. % Eu].

Thus formed Li$_3$Cs$_2$I$_5$:Eu is evaporated subsequently to form a homogenous film. The shutter (d), as shown in FIG. 4, protects the substrate from any undesired deposition during the melt-phase formation and is opened following the completion of reaction in the melt phase to initiate the vapor-transported film growth.

Figure 5:
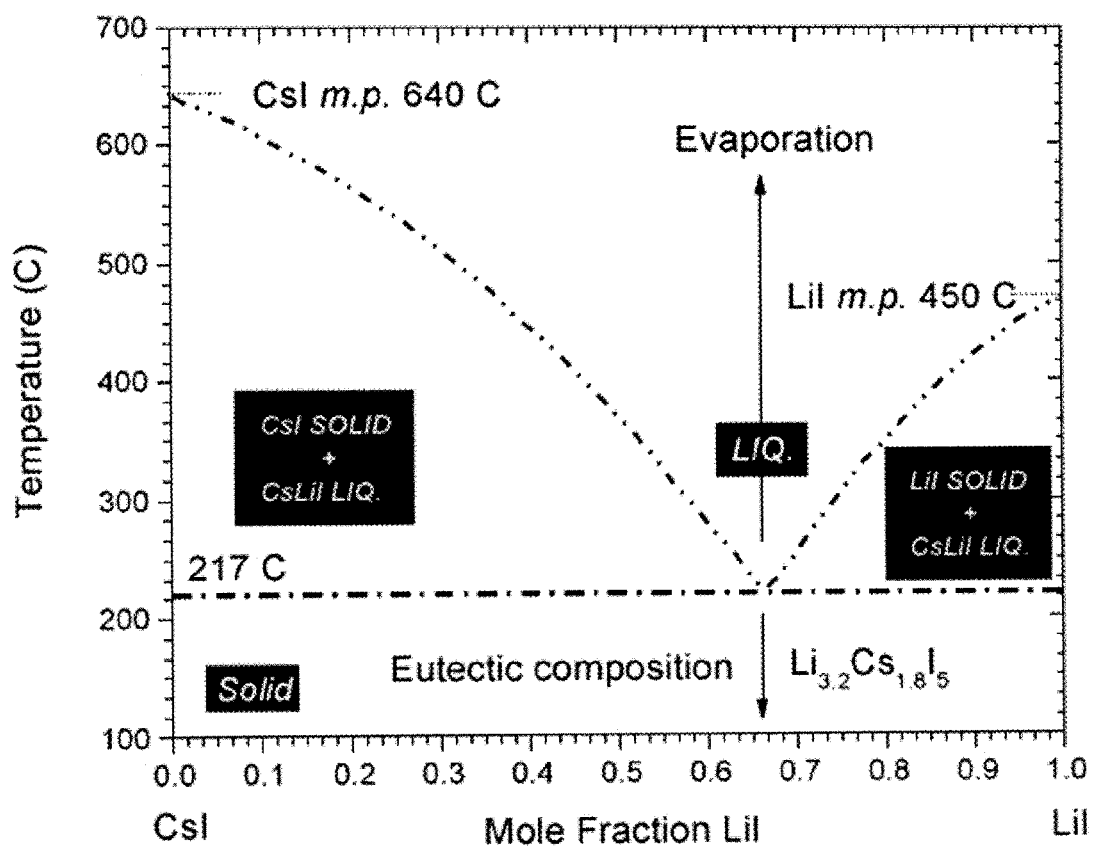
FIG. 5 illustrates a phase diagram for CsI-LiI binary systems

FIG. 5 illustrates a phase diagram for CsI-LiI binary systems. It is discovered that the thermodynamic eutectic composition of Li$_{3.2}$Cs$_{1.8}$I$_5$ is very close to the desired composition of Li$_3$Cs$_2$I$_5$. Based on the phase diagram in FIG. 5, it is clear that the eutectic composition completely melts (with no solid phases) at temperature as low as ~217° C. This is a key parameter for our growth process, because it enables the liquid-melt-phase reaction of CsI-LiI mixture at temperature low enough to avoid any vapor-phase loss of material that may alter the eutectic composition. As can be seen from the phase diagram in FIG. 5, any deviation from the eutectic temperature results in precipitation of CsI or LiI solids in the melt, which is undesired.

The modified HWE enables the formation of single phase of the ternary compounds by starting with eutectic mixture of CsI and LiI. In one embodiment, it takes about 20 hrs at 220° C. to complete the chemical reaction in the liquid melt and following which the shutter is opened to evaporate the film onto suitable substrates. Although the case of LCI is discussed above, it is appreciated that a similar approach is applicable for LNI system of materials. This modified HWE greatly enhances the ability to produce large area films on a commercial scale.

Hermetic Sealing and Reflective Coating

After deposition, the films are hermetically sealed immediately, without any exposure to room atmosphere. An apparatus is designed and used to transfer the films to a dry box where humidity is maintained at <0.1%. Once inside the dry box, a reflective coating is applied and the entire film encapsulated to prevent exposure to air and subsequent degradation. For simplicity, the scintillator specimens are carefully wrapped in Teflon tape, which acted as a reflector. Reflective paint may also be used to enhance light collection from the packaged materials.

Although the teachings have been described with respect to various embodiments, it should be realized these teachings are also capable of a wide variety of further and other embodiments within the spirit and scope of the appended claims.

What is claimed is:

1. A neutron detector, comprising:
  a photodetector; and
  a solid-state scintillator disposed on the photodetector; wherein the solid-state scintillator comprises a bi-alkali iodide material, the bi-alkali iodide material being doped with one or more dopant elements.

2. The neutron detector of claim 1, wherein the solid-state scintillator comprises a plurality of microcolumns.

3. The neutron detector of claim 1, wherein the bi-alkali iodide material has a monoclinic crystal structure.

4. The neutron detector of claim 1, wherein the solid-state scintillator comprises one of a first bi-alkali iodide material wherein a first alkali metal is Lithium and a second alkali metal is Cesium and a second bi-alkali iodide material wherein the first alkali metal is Lithium and the second alkali metal is Sodium.

5. The neutron detector of claim 4, wherein the one or more dopant elements comprise one or more of a periodic table group 13 element and a periodic table lanthanide element.

6. The neutron detector of claim 5, wherein the one or more dopant elements comprise one or more of thallium and europium.

7. A method for fabricating a neutron detector, comprising:
  operatively coupling a solid-state scintillator on a photodetector to form a detector structure; the solid-state scintillator comprising a bi-alkali iodide material, the bi-alkali iodide material being doped with a dopant element; wherein the dopant element comprises one or more of a periodic table group 13 element and a periodic table lanthanide element.

8. The method of claim 7, further comprising hermetically sealing the detector structure.

9. The method of claim 8, wherein hermetically sealing comprises applying a reflective coating to the detector structure.

10. A method for synthesizing a scintillator material comprising:
  mixing a first alkali iodide material and a second alkali iodide material to form a bi-alkali iodide material; and
  adding to the bi-alkali iodide material one or more metallic iodide materials, which result in dopants, to form a scintillator material.

11. The method of claim 10, further comprising depositing the scintillator material.

12. The method of claim 11, wherein depositing the scintillator material comprises evaporating the scintillator material using a hot wall evaporation apparatus.

13. A solid-state scintillator comprising a bi-alkali iodide material, the bi-alkali iodide material being doped with one or more dopant elements.

14. The solid-state scintillator of claim 13 wherein the bi-alkali iodide material comprises one of a first bi-alkali iodide material wherein a first alkali metal is Lithium and a second alkali metal is Cesium and a second bi-alkali iodide material wherein the first alkali metal is Lithium and the second alkali metal is Sodium.

15. The solid-state scintillator of claim 14 wherein the one or more dopant elements comprise one or more of a periodic table group 13 element and a periodic table lanthanide element.

16. The solid-state scintillator of claim 15 wherein the one or more dopant elements comprise one or more of thallium and europium.

17. The solid-state scintillator of claim 15 wherein a concentration of the one or more dopant elements is between about 0.4% and 0.8%.

18. The solid-state scintillator of claim 13 wherein the solid-state scintillator comprises a plurality of microcolumns.

19. The solid-state scintillator of claim 13 wherein the bi-alkali iodide material has a monoclinic crystal structure.

20. The neutron detector of claim 4, wherein a concentration of the one or more dopant elements is between about 0.4% and 0.8%.

* * * * *